United States Patent
Harding et al.

[11] Patent Number: 5,904,962
[45] Date of Patent: May 18, 1999

[54] RAISED MOUNTING SYSTEM FOR ARTISTIC WORK

[75] Inventors: Glenn T. Harding, Agincourt; William D. Harding, Unionville; William Liddle, Ajax, all of Canada

[73] Assignee: Hallmark Cards, Incorporated, Kansas City, Mo.

[21] Appl. No.: 08/678,806

[22] Filed: Jul. 12, 1996

[51] Int. Cl.⁶ ............................ B29C 51/10; B44F 11/02
[52] U.S. Cl. ................................................ 428/14; 428/195
[58] Field of Search .................................. 428/13, 14, 15, 428/195

[56] References Cited

U.S. PATENT DOCUMENTS

| | | | |
|---|---|---|---|
| 36,821 | 10/1862 | Poitevin | 264/227 |
| 2,393,809 | 1/1946 | Potter | 283/2 |
| 2,673,371 | 3/1954 | Uhlig | 264/237 |
| 2,765,512 | 10/1956 | Nesbit | 264/28 |
| 3,010,152 | 11/1961 | Braund | 156/292 X |
| 3,543,336 | 12/1970 | Feeney | 425/86 |
| 3,763,296 | 10/1973 | Burrows | 264/71 |
| 3,846,533 | 11/1974 | Carrier | 264/225 |
| 3,873,342 | 3/1975 | Ellison | 428/13 |
| 3,880,686 | 4/1975 | Robinson | 428/13 X |
| 3,917,786 | 11/1975 | Weigert | 264/129 |
| 3,989,790 | 11/1976 | Bruner et al. | 264/225 |
| 4,001,062 | 1/1977 | Itsaka et al. | 428/15 X |
| 4,091,154 | 5/1978 | Hirai | 428/158 |
| 4,120,930 | 10/1978 | Lemelson | 264/225 |
| 4,163,813 | 8/1979 | Sheets et al. | 428/39 X |
| 4,285,744 | 8/1981 | Rudolf et al. | 428/15 X |
| 4,308,224 | 12/1981 | Becker | 264/451 |
| 4,971,743 | 11/1990 | Lang | 264/132 |
| 5,102,171 | 4/1992 | Saetre | 283/117 |

(List continued on next page.)

FOREIGN PATENT DOCUMENTS

| | | |
|---|---|---|
| 990506 | 6/1976 | Canada . |
| 2014525 | 10/1991 | Canada . |
| 2020206 | 12/1991 | Canada . |
| 0 658 447 | 6/1995 | European Pat. Off. . |
| 1 493 516 | 7/1967 | France . |
| 1 548 337 | 10/1968 | France . |
| 2 678 552 | 1/1993 | France . |
| 29 04 194 | 6/1979 | Germany . |
| 51-59515 | 5/1976 | Japan . |
| 57-126624 | 8/1982 | Japan . |
| 60-220729 | 11/1985 | Japan . |
| 5-261802 | 10/1993 | Japan . |
| 1107401 | 9/1964 | United Kingdom . |
| 1161991 | 8/1969 | United Kingdom . |
| 1 454 786 | 11/1976 | United Kingdom . |
| 1 572 324 | 7/1980 | United Kingdom . |
| 1572324 | 7/1980 | United Kingdom ................... 428/195 |
| 2 060 375 | 5/1981 | United Kingdom . |

(List continued on next page.)

OTHER PUBLICATIONS

PCT Search Report—PCT/CA96/00176.
PCT Search Report—PCT/CA97/00313.
PCT Search Report—PCT/CA97/00464.

*Primary Examiner*—Henry F. Epstein
*Attorney, Agent, or Firm*—Leydig, Voit & Mayer, Ltd.

[57] ABSTRACT

A framed art reproduction comprises:

i) a thin sheet of deformable substrate having an artistic image reproduced on a front face thereof, ii) the thin sheet having an integral raised land portion containing the image, an integral flange surrounding the raised land and an integral continuous lip interconnecting the raised land to the flange, the lip being of a predetermined height defined by an extent to which the raised land is deformed in the substrate;

iii) a matte for framing the raised land, the matte having an aperture provided therein as defined by an aperture edge of the matte, the aperture edge being dimensioned to engage the continuous lip and locate thereby the raised land relative to the matte; and iv) means for securing the located raised land in the matte with the flange contacting the matte.

10 Claims, 7 Drawing Sheets

U.S. PATENT DOCUMENTS

| | | | |
|---|---|---|---|
| 5,116,562 | 5/1992 | Lang | 264/132 |
| 5,120,090 | 6/1992 | Reinl | 283/117 |
| 5,152,861 | 10/1992 | Hann | 156/230 |
| 5,182,063 | 1/1993 | Lang et al. | 264/132 |
| 5,201,548 | 4/1993 | Lang et al. | 40/124.01 X |
| 5,214,022 | 5/1993 | Busch et al. | 503/227 |
| 5,286,558 | 2/1994 | Seo et al. | 428/13 X |
| 5,314,370 | 5/1994 | Flint | 446/391 |
| 5,473,159 | 12/1995 | Krieger | 250/318 |
| 5,667,747 | 9/1997 | Harding et al. | 428/195 X |
| 5,721,041 | 2/1998 | Baratto | 428/195 |

FOREIGN PATENT DOCUMENTS

| | | |
|---|---|---|
| 2281535 | 3/1995 | United Kingdom . |
| WO 89/07530 | 8/1989 | WIPO . |
| WO91109743 | 7/1991 | WIPO . |
| WO9629189 | 9/1996 | WIPO . |

RAISED MOUNTING SYSTEM FOR ARTISTIC WORK

FIELD OF THE INVENTION

This invention relates to a mounting system for artistic works, and in particular framed art reproductions which are made from a deformable substrate.

BACKGROUND OF THE INVENTION

Considerable efforts have been made in the area of producing inexpensive reproductions of original artwork. Such reproductions are commonly sold as framed art but may also be sold as unframed art, as artwork in greeting cards, calendars, books and the like, covers for various consumer items, such as perfumes, cigarettes, wine, liquor, packaged foods, etcetera, clothing and apparel packages, puzzles, paint by number artwork, board games, maps, sporting goods, sporting bags to name but a few applications of this technology. In applicant's co-pending application Ser. No. 08/408,900 filed Mar. 22, 1995, abandoned in favour of Continuation application Ser. No. 08/618,401, now U.S. Pat. No. 5,667,747, a vacuum formed three-dimensional surface article is described, particularly as that article would relate to the reproduction of original works of art. The system described is very effective in vacuum forming a thermoformable plastic sheet to reproduce in the thermoformed product a surface texture which simulates the artist's brushstrokes of the original where such surface texture is in register with the image printed on the plastic sheet.

Other examples of embossed thermoformed or pressed substrates in making reproductions of artwork is defined for example in U.S. Pat. No. 3,010,152. A thermoformable sheet is vacuum formed to provide a surface relief to the resultant globe which would resemble mountains, valleys and the like. An embossing technique for paper or plastic is described in U.S. Pat. Nos. 5,182,063 and 5,201,548. Other techniques for pressing a three-dimensional relief into the printed image are described in U.S. Pat. Nos. 4,285,744 and 4,308,224. These various processes provide in one degree or another suitable reproductions of the original. The framing of these various reproductions is carried out in the normal manner where the embossed or pressed paper or plastic article is mounted in its generally flat state on a suitable stretcher board or the like and framed in the normal manner. Such framing techniques are quite common and often used in framing oil paintings. Because of the nature of the surface of the manufactured article, it is usually not necessary to cover the faces of the reproduction with glass or other transparent material because the surface of the reproduction can withstand normal use. The other alternative in framing reproductions is to use a transparent cover such as glass or plastic where the cover protects the underlying artistic reproduction which may be a water colour or the like. As with the framing of oil paintings, mattes are commonly used to surround or frame the water colour or other type of reproduction which is then subsequently framed about its perimeter to provide a complete product.

The artistic reproductions may also be used in greeting cards, calendars, books and the like. As described in U.S. Pat. No. 5,182,063, the reproduction is out to size and laminated to a backing which in turn is mounted on a suitable support which may be a greeting card, a calendar base or the front cover of a book. The cutting to size of the artistic reproduction, laminating it to a suitable substrate is very time-consuming and laborious. The substrate may be subject to warping due to ambient moisture conditions. The substrate with the print or artistic reproduction laminated thereto is subject to curling at the edges or possibly being ripped from the substrate. Although such artistic reproduction assemblage is acceptable for the inexpensive line of consumer items, the assembly suffers greatly from costs of manufacture and product stability. Not only from the standpoint of dimensional stability but as well stability of the artistic reproduction in the matte for the framed reproduction.

It is therefore an object of an aspect of this invention to provide an artistic reproduction which is dimensionally stable and is readily assembled, as a framed piece of artwork or as a piece of artwork to complement other types of consumer items.

SUMMARY OF THE INVENTION

According to an aspect of the invention there is provided, a framed art reproduction which comprises:

i) a thin sheet of deformable substrate having an artistic image reproduced on a front face thereof, ii) the thin sheet having an integral raised land portion containing the image, an integral flange surrounding the raised land and an integral continuous lip interconnecting the raised land to the flange, the lip being of a predetermined height defined by an extent to which the raised land is deformed in the substrate, the raised land as deformed in the substrate defining a recess in a rear face of the substrate, iii) a matte for framing the raised land, the matte having an aperture provided therein as defined by an aperture edge of the matte, the aperture edge being dimensioned to engage the continuous lip and locate thereby the raised land relative to the matte; and iv) means for securing the located raised land in the matte with the flange contacting the matte.

According to another aspect of the invention, there is provided, a thermoformed art reproduction which comprises an image printed on a face of a thermoformable plastic sheet, the sheet having thermoformed therein a raised land which includes a portion of the image and has a thermoformed surface texture which reproduces brushstrokes of an original painting of the image.

According to a further aspect of the invention, there is provided, a vacuum forming process for molding a thin sheet of a thermoformable plastic into an accurate three-dimensional relief reproduction of an original artwork, the process comprising simultaneously thermoforming in the sheet a raised land which includes at least a portion of an image printed on a face thereof and a surface texture in the raised land which resembles original brushstrokes in register with the image.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
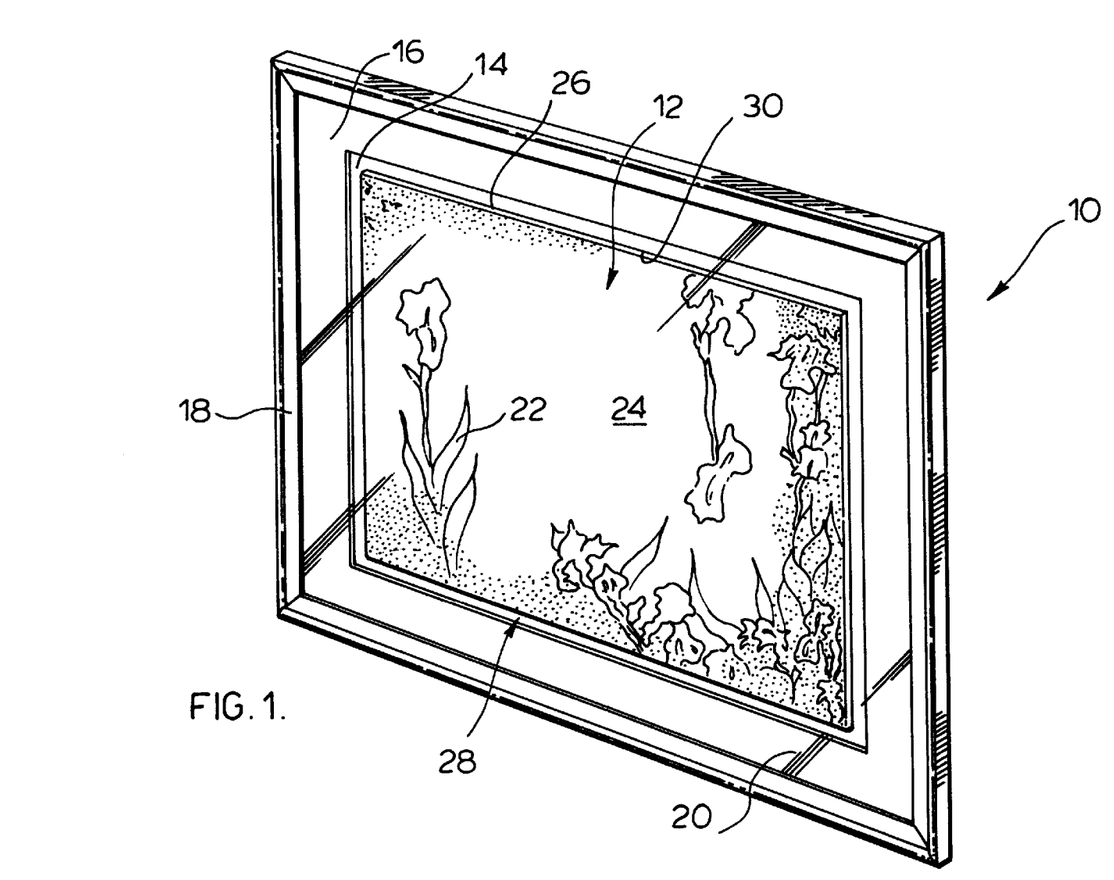
FIG. 1 is a perspective view of a framed art reproduction in accordance with a preferred embodiment of the invention.

A variety of styles are available for completing or presenting art reproductions. Usually the art reproduction is framed in some manner to enhance the character of the reproduction. As previously discussed, the various embodiments of this invention are not only applicable in art reproductions, calendars, granting cards and other like products but as well in clothing, sporting equipment, commodity cases, product packaging and the like. The embodiment of FIG. 1 shows the framed art reproduction 10 with the artwork of this invention 12 framed by a first matte 14 and a second overlying matte 16 and a perimeter frame 18. Optionally, glass 20 may be included in the perimeter frame 18. In accordance with this invention, the art reproduction 12 presents an artistic image 22 on a raised land 24 which has a continuous integral lip 26. The matte 14 has a aperture 28 provided therein, which is defined by the aperture edge 30. The aperture is dimensioned such that the aperture edge 30 engages the lip 26 of the raised land 24 of the formed art reproduction.

The image 22 may be printed on any type of thin sheet of deformable substrate. In accordance with the preferred embodiment of the invention, the deformable substrate may be paper or plastic. The paper is of a composition which can be embossed whereas the plastic is a thermoplastic and is readily thermoformed into the desired shape to define the raised land 24 with the lip 26, the details of which will be described with respect to FIGS. 2 through 4. In accordance with the procedure defined in applicant's co-pending application Ser. No. 08/618,401, the thin sheet has formed therein a surface texture which resembles the painting strokes such as brushstrokes, pallet knife, sponge or cloth work of the original oil or acrylic and which is in register with the image so as to recreate the visual appearance of the original. Hence, with thermoformed plastic substrates, where the surface texture simulates brushstrokes, it is desirable not to have the glass 20 in the frame so that the light reflects off of the textured surface to give the true effect of the light reflecting off of this textured surface to simulate thereby the original. Normally, for large size art reproductions the thermoformed plastic sheet is secured to a stretcher frame to provide a reproduction in a base format, the same as that of the original artwork. The thermoformed plastic sheet on the stretcher frame is then framed in accordance with standard techniques. Usually artwork of this nature is sold as a higher priced art reproduction. As already described, the problem with this type of mounting in providing less expensive art reproductions which are framed and which may be used in calendar and greeting cards is that the art reproduction is not readily mounted.

In accordance with this invention, by providing the raised land 24 and a matte 14, the art reproduction is framed and its position located relative to the matte 14 to facilitate either completing the assembly as a framed artwork, as shown in FIG. 1, or for use in other presentations such as calendars and greeting cards and other formats, as previously described. By use of the term matte, it is intended to include not only its normal meaning, but as well any other type of holder for the art reproduction where the holder has an aperture for engaging the lip of the raised land, such as, an underlay.

Figure 2:
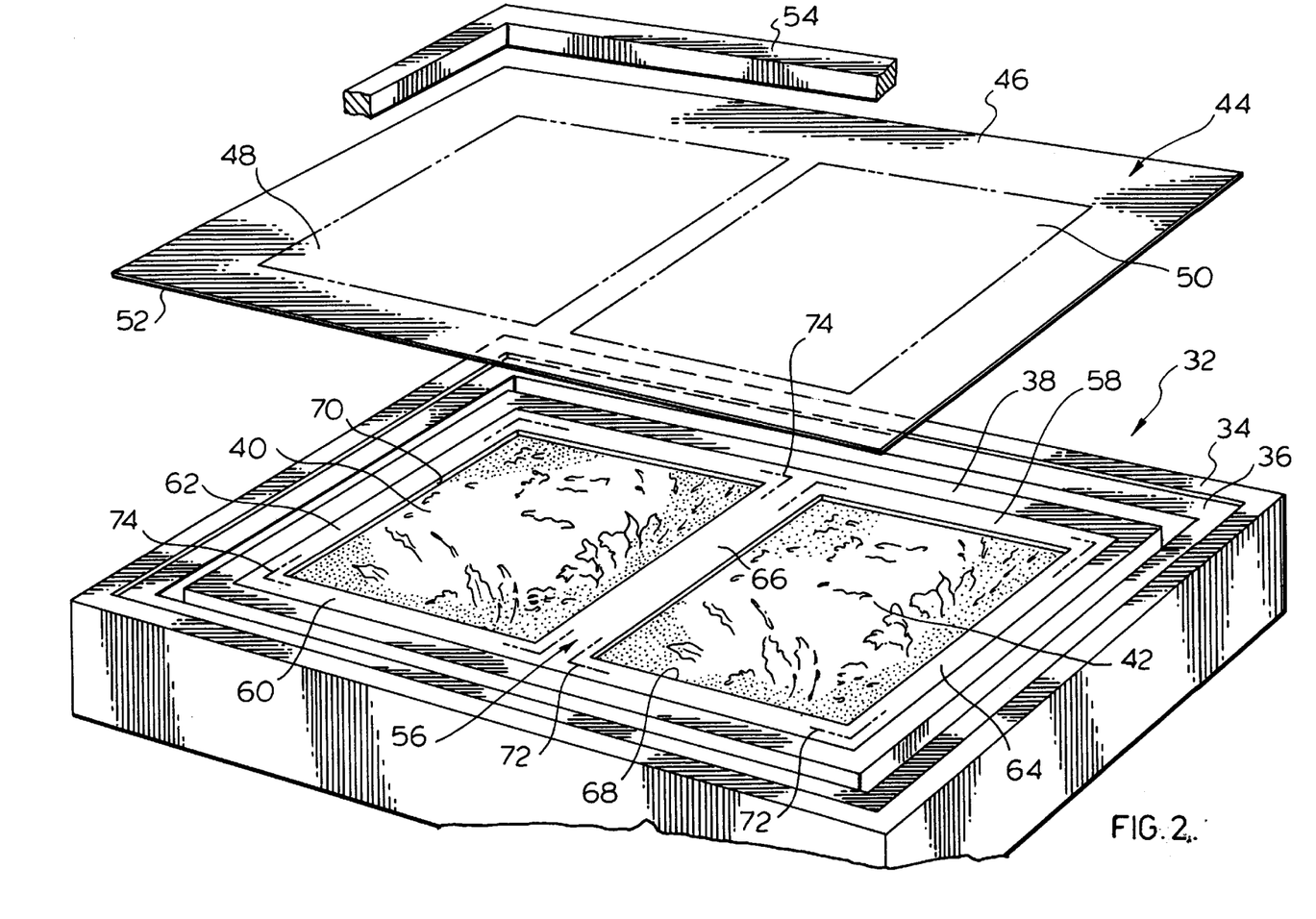
FIG. 2 is a perspective view of the female mold and vacuum forming template to be placed on the mold.

The vacuum forming mold which may be of the type as described in applicant's co-pending application Ser. No. 08/618,401 is shown in FIG. 2. In accordance with this particular embodiment, the female vacuum forming mold 32 has an outer clamping frame 34 which has a perimeter recess 36. Inwardly of this recess and spaced therefrom is the outer box 38 of the female mold where, in accordance with this embodiment, the female mold comprises two discreet regions 40 and 42 which will thermoform in the plastic sheet 44 the surface texture to simulate the brushstrokes of the original. It is appreciated that patterns of female mold regions 40 and 42 may be the same or different depending upon the images printed on the sheet 44. The backside of the sheet 46 hag shown therein in dot position of the images 48 and 50 which are printed on the front faces 52 of the sheet 44. Above the sheet 44 is a section of the perimeter clamp 54 which secures the sheet 44 in the mold 32 by alignment with the recess 36, which is shown in more detail in FIG. 3.

The female mold includes a raised template 56 which has upper and lower rails 58 and 60 with integral Side rails 62 and 64 and an integral crossbar rail 66. The purpose of the raised template is to define the perimeter of the raised land 24 of the formed reproduction. It is appreciated that if the female mold is only used to form a single reproduction then the central crossbar 66 would not be required. Alternatively, if the female mold is designed to make multiples of formed reproductions of four or more, then the number of crossbars 66 would be increased to define the perimeter of the raised land for each reproduction multiple made by the female mold.

In accordance with a preferred embodiment of the invention, the images 48 and 50 are of a dimension greater than the perimeter edge 68 or 70 of the respective openings in the raised template 56. To demonstrate this, on the top of the raised template the dotted lines 72 and 74 show where the image lands on the raised template where the sheet 44 is positioned in the mold for purposes of forming. Although this is not essential for reasons to be described with respect to FIGS. 5 and 6, it is beneficial to have the image extend over top of the raised template 56.

Figure 3:
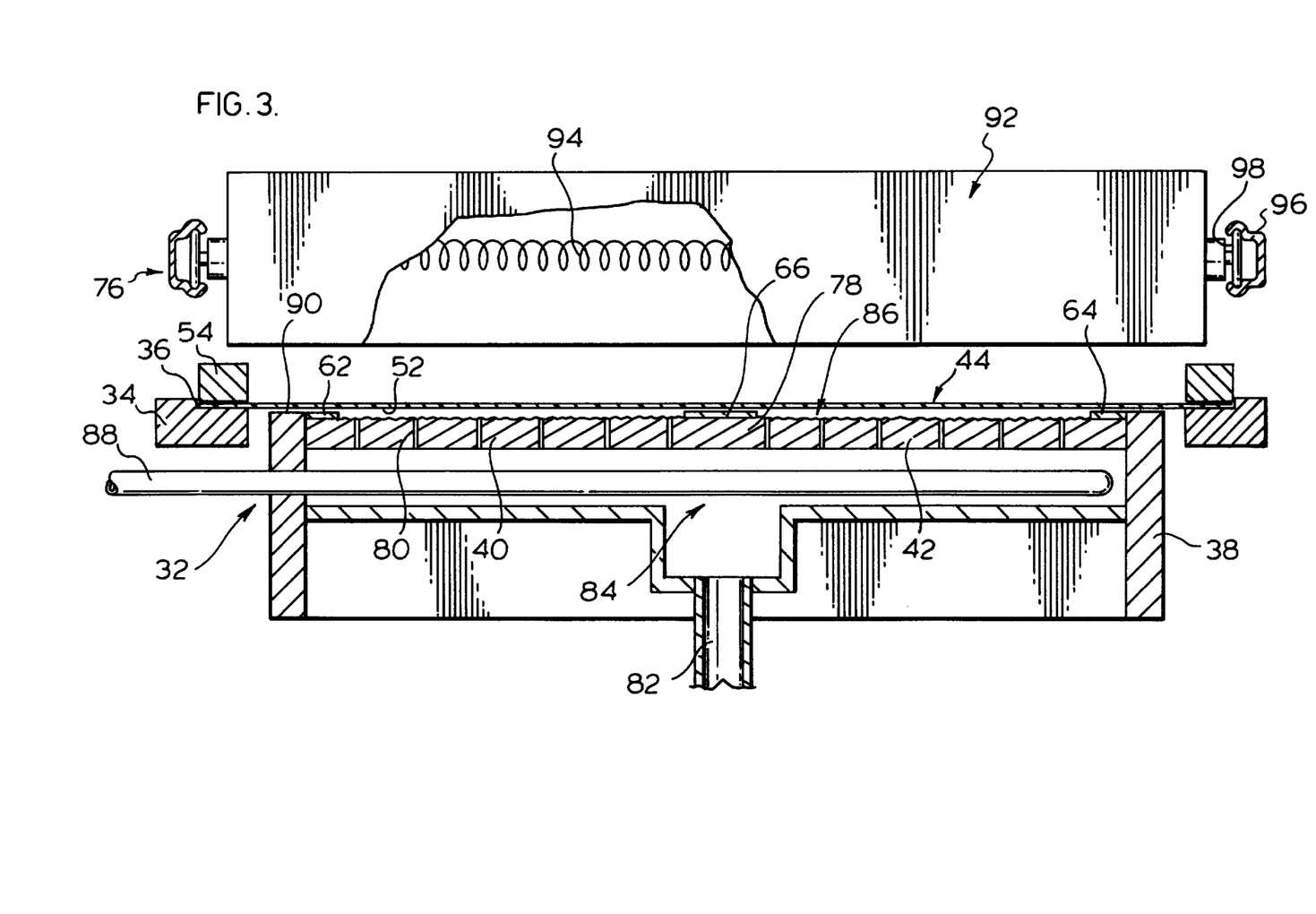
FIG. 3 is a section through the vacuum forming apparatus showing the sheet to be vacuum formed in position and being heated.

As shown in FIG. 3, the thermoforming apparatus 76 may be of a type described in applicant's co-pending application Ser. No. 08/618,401. The thermoforming mold 32 has the respective female mold portions 40 and 42 formed in a single plate 78. The manufacture of the female mold may be in accordance with applicant's co-pending application Ser. No. 08/618,401 where the plate is formed of a cured apoxy. The female mold has the usual apertures 80 provided therein so that when vacuum is drawn on line 82 to develop a vacuum in the vacuum box 84, the heated sheet 44 in drawn down onto the upper surface 26 of the female mold. In accordance with this embodiment, cooling to the underside of the female mold may be provided in cooling tubes 88 which ensure that the female mold does not overheat during repeated cycles of operation. The female mold plate 78 is set in the perimeter wall 38 of the vacuum box where the upper surface 86 of the mold may be slightly below the upper edge 90 of the perimeter wall 38 to ensure a seal between the upper wall 90 and the front face 52 of the sheet 44. The sheet is clamped outside of the vacuum box 58 by fitting the sheet in the perimeter frame 34 which has the recess 36 to receive the outer edge of the sheet. The sheet is clamped in position by lowering the clamp 54 into the recess 36.

Above the vacuum box is a heater 92 which has heating elements 94. The heater 92 moves outward of the apparatus on top of the mold box 38 for purposes of heating the sheet 44 and then moves back into the apparatus to allow the sheet to set during the thermoforming process. To accommodate such movement of the heater 92, it is mounted on a rail system 96 by transversely extending wheels 98.

The female mold regions 40 and 42 have the raised template 56 secured thereto and is shown in FIG. 3. The side rails 62 and 64 are provided at the outer perimeter of the mold and the central rail 66 is positioned between the two female molds 40 and 42. The thickness of the raised template 56 defines the extent to which the raised land of the thermoformed art reproduction extends outwardly of the front face 52 of the sheet. As is apparent from the arrangement of FIG. 3, the raised template 56 is of a thickness such that when the sheet is positioned in the mold, its face 52 is slightly above the template components 62, 64 and 66.

Figure 4:
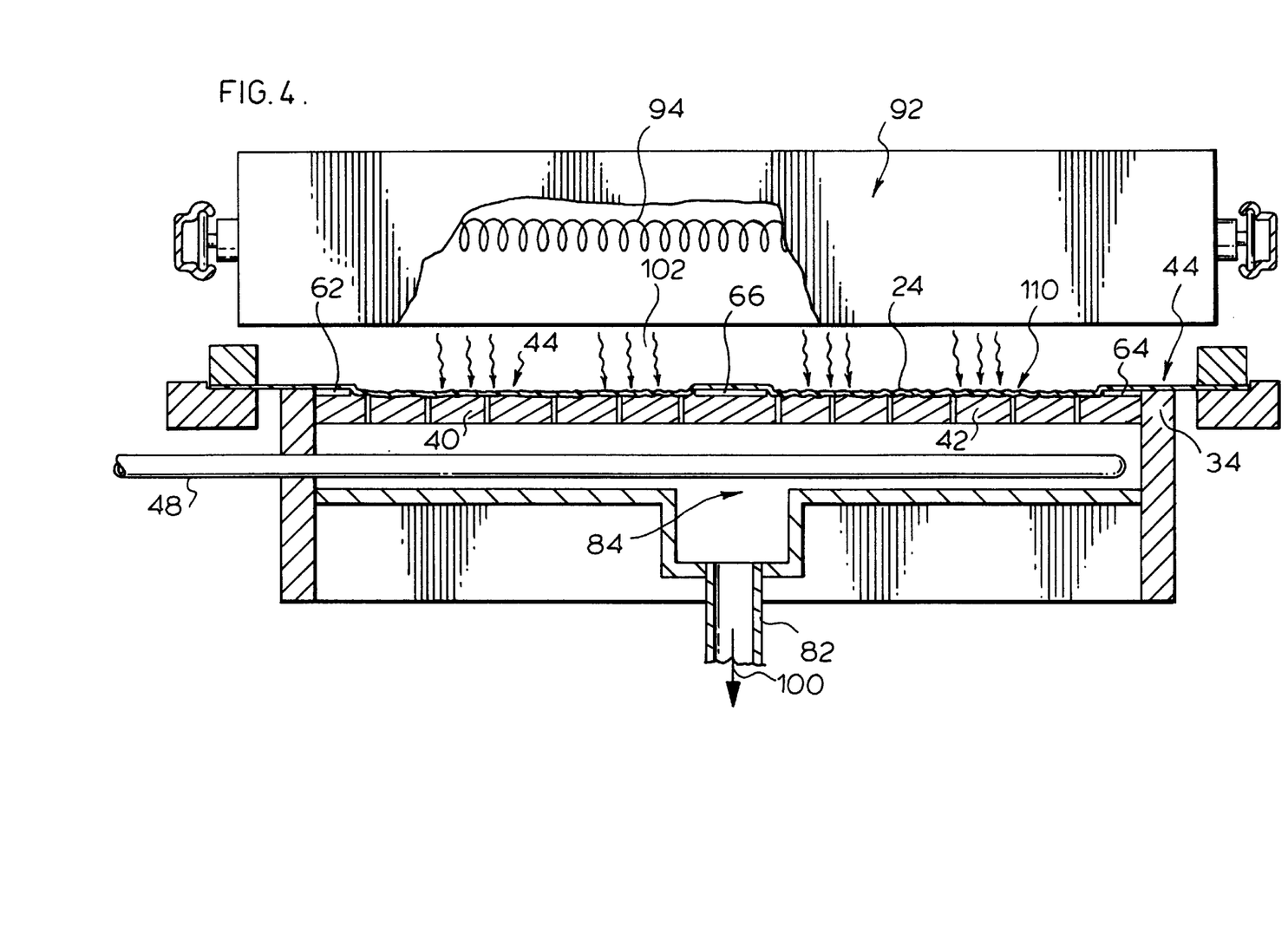
FIG. 4 is a section of FIG. 3 where the sheet has been heated and vacuum formed to the face of the female mold.
Figure 5:
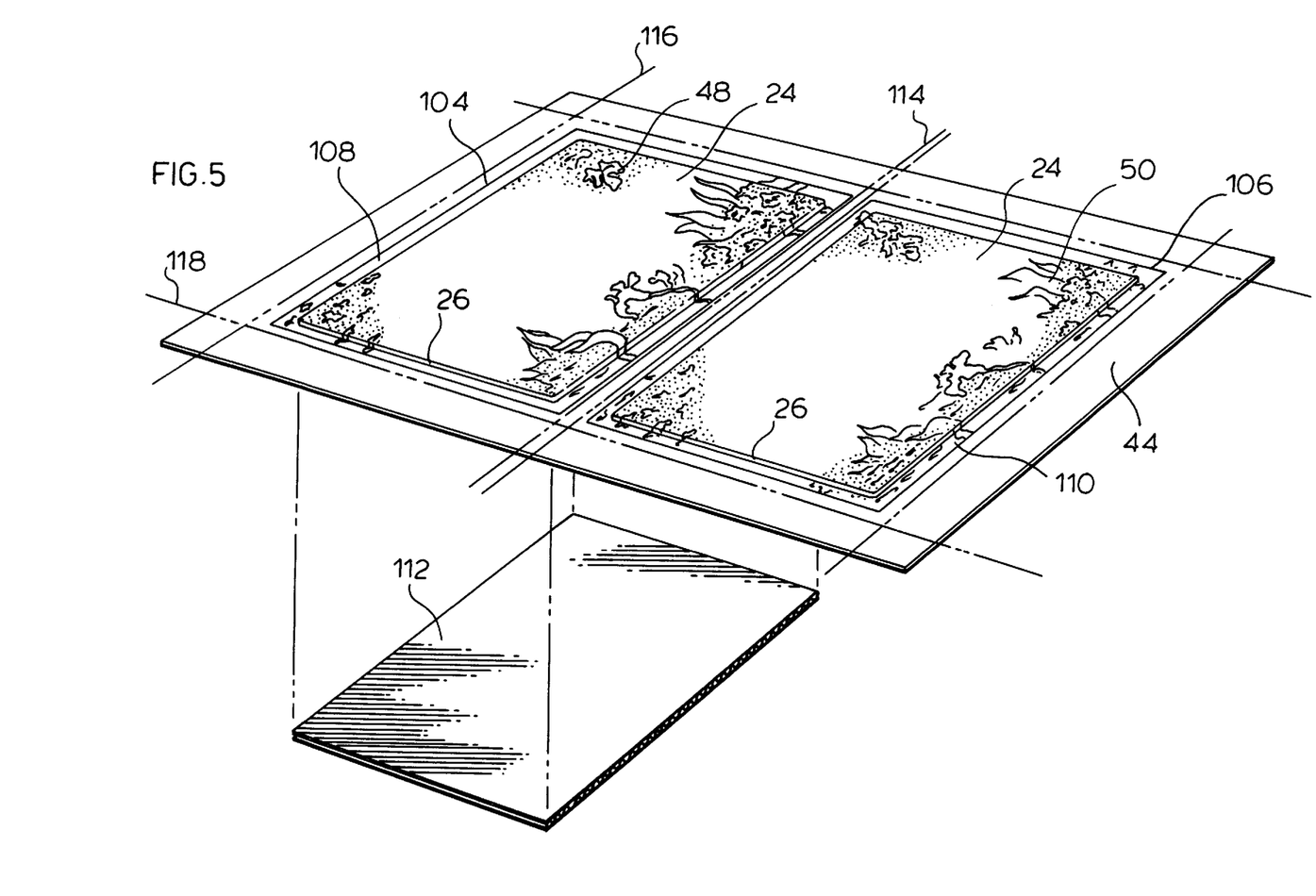
FIG. 5 shows the vacuum formed sheet removed from the mold and a backing to be placed on the rear of the thermoformed artwork.

In accordance with the procedure described in applicant's co-pending application, the sheet 44 may be thermoformed with the thermoforming apparatus 76 by heating the sheet to a first temperature and placing a vacuum in line 82 as demonstrated by arrow 100 to develop the necessary vacuum in box 84. This fixes the position of the image relative to the patterned surface of the female mold to produce in the sheet the corresponding surface texture which is in register with the image. Heating of the sheet is continued until the sheet attains the thermoforming temperature and assumes the surface relief of the female mold. As demonstrated in FIG. 4, the heater element 94 projects heat in the direction of arrows 102 onto the sheet 44. The sheet 44 is drawn down onto the face of the female molds 40 and 42 where the sheet folds over the components of the raised template, namely the centre bar 66 and the side bars 62 and 64 to define thereby the raised land 24 of each reproduction. Vacuum is maintained on the system until the sheet is cooled. Normally cooling air is directed on top of the sheet after the heater 92 has been retracted. During this entire period vacuum is maintained in the vacuum box by forming a seal between the sheet 44 and the upper region of the side member of the vacuum forming mold 32. Suitable cooling is applied to the mold during the cycle through the cooling elements 48. After the sheet is cooled, it is then removed from the mold to provide a thermoformed element, as shown in FIG. 5. It is understood of course that paper may also be formed with a surface texture by using suitable embossing dies. The embossing dies would include elements on the embossing die faces to form the raised land regions 24.

As shown in FIG. 5, the formed product has the duplicate images 48 and 50 provided in the respective raised lands 24. The images 48 and 50 are defined by the perimeter edges 104 and 106. The raised template has, as is apparent from FIG. 5, overlaid the perimeter portions 108 and 110 of the images such that this portion of the image remains in the plane of the sheet 44. However, the raised template forms the raised lands 24 where the raised lands have the continuous peripheral lips 26. As shown in FIG. 4, the thermoforming of the raised lands in the sheet 44 defines a recess 110 behind each raised land to provide support for the rained land 24, a sheet of cardboard or other stiffening substrata 112 is cut to fit within the recess 110.

Figure 6:
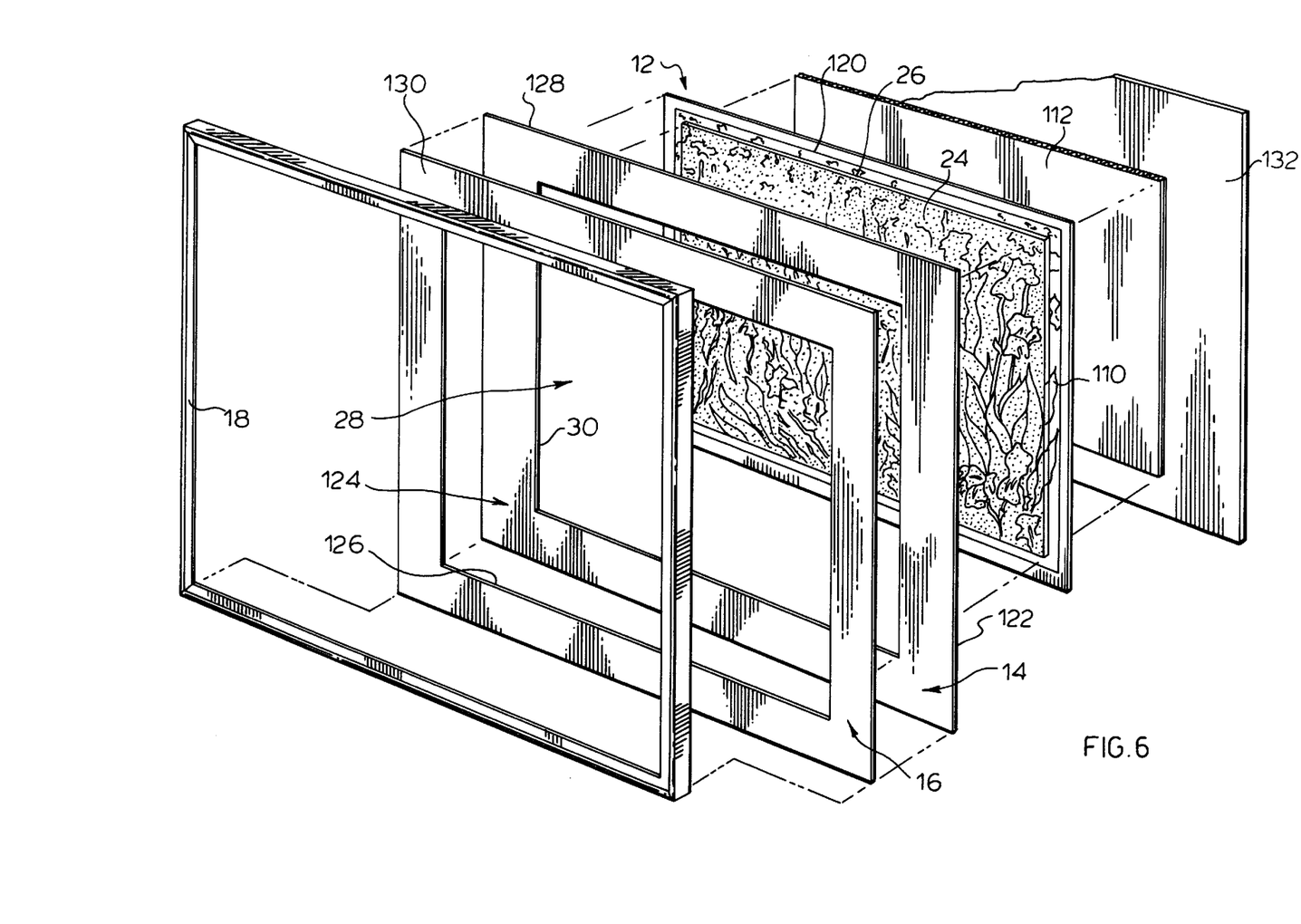
FIG. 6 is an exploded view in perspective of the framed art reproduction of FIG. 1.

The thermoformed sheet of FIG. 5 may be cut along the lines 114 to separate the images and then cut along lines 116 and 118 to form the completed art reproduction. This finished product is shown in FIG. 6 at 12. It has the raised land portion 24 with an integral flange 120 surrounding the raised land portion 24. The flange 120 is connected to the land portion by the continuous peripheral lip 26. The backing substrate 112 may be positioned in the recess behind the raised land 24. This lends support, if desired, to the raised land portion 24, although it is understood that the backing 112 is optional. The backing may be of any suitable substrate ouch as cardboard, foamboard, corrugated cardboard or fibreboard. Furthermore, the backing may be glue or otherwise secured in the recess. The principal feature of the invention is in locating the art reproduction 12 with a matte 14. The matte 14 has an aperture defined therein and through which the rained land 24 projects. The aperture 28 is defined by an aperture edge 30 which in dimensioned to receive raised land 24 and be in register with and engage the continuous lip 26. Such registration of the raised land in the matte 14 locates the raised land relative to the matte 14. This manner of locating the reproduction 12 relative to the matte 14 provides a consistent inexpensive way of assembling an artistic reproduction. The flange 120 may be secured in one manner or another to the rear face 122 of the matte 14. This ensures that the art reproduction 12 does not fall away from the matte 14 during handling. It is also understood that the matte 14 may constitute the complete frame for the art reproduction 12 in which instance the rear face 122 of the matte would be secured, glued or in some way fastened to the flange 120.

By dimensioning the aperture edge 30 to fit snugly with the lip 26, registration of the art reproduction 12 is always assured in the final product. The provision of the flange 120 and lip 26 avoids having to glue, paste or otherwise secure a print to a backing for the usual mounting in a frame, especially for products directed at the low end of market pricing.

As shown in FIG. 6, the image 110 extends over onto the flange 120 and hence, along the face of the lip 26. Preferably, the height of the lip 26 is greater than the thickness of the matte 14 so that the raised land 24 projects through and stands proud of the matte 14. This provides a very attractive finish about the edge of the art reproduction to give an attractive appearance to the a low priced product. Although it is understood that the raised land may define a lip 26 of a height which is equal to or less than the thickness of the matte 14 to provide the desired affect depending on the product. Whatever the height of the lip, it is sufficiently defined to ensure that it is engaged by the aperture edge 30 of the matte 14.

It is also understood that this type of mounting is preferred with small print sizes in the range of 24×24 and less. It is also understood that this type of mounting may be employed in extremely small print sizes of perhaps even 1 inch×2 inch such as would be used on clothing apparel and the like. The limitation in how small the art reproduction may be is determined by the thickness of the sheet used and the ability to either emboss or thermoform the material to the desired shape and with the desired surface texture on the raised land portion. It is also understood that the art reproduction 12 may only have the raised land portion 24 where the surface of the raised land 24 is planar without any surface texture. This arrangement is quite acceptable with prints which are lithographed and which are not intended to look like oils. These would normally be productions of water colours. With this type of art reproduction, it may be preferable to include a glass in the perimeter frame 18.

With the art reproduction in the matte 14, the backing 112 may be positioned in the recess. An additional, optional overlay matte 16 may be provided on top of matte 14. The aperture 124 is greater than the aperture size 28 to provide a border around the aperture 28. The aperture 124 in defined by aperture edge 126 to give the spaced apart effect, as shown in FIG. 1 of the aperture edges 30 and 126 and at the same time provide additional depth to the mounting or the artwork. The matte 16 is placed within the frame 18. The matte 14 is placed on top of matte 16 where the outer perimeters 128 and 130 of mattes 14 and 16 are the same to thereby locate the mattes relative to one another and register the respective apertures 124 with 28. With the backing 112 in place in the recess, the frame backing 132 is placed on top and secured in the usual manner with clips or the like in frame 18 and can be adapted in the usual way for hanging or the like.

Figures 7, 8:
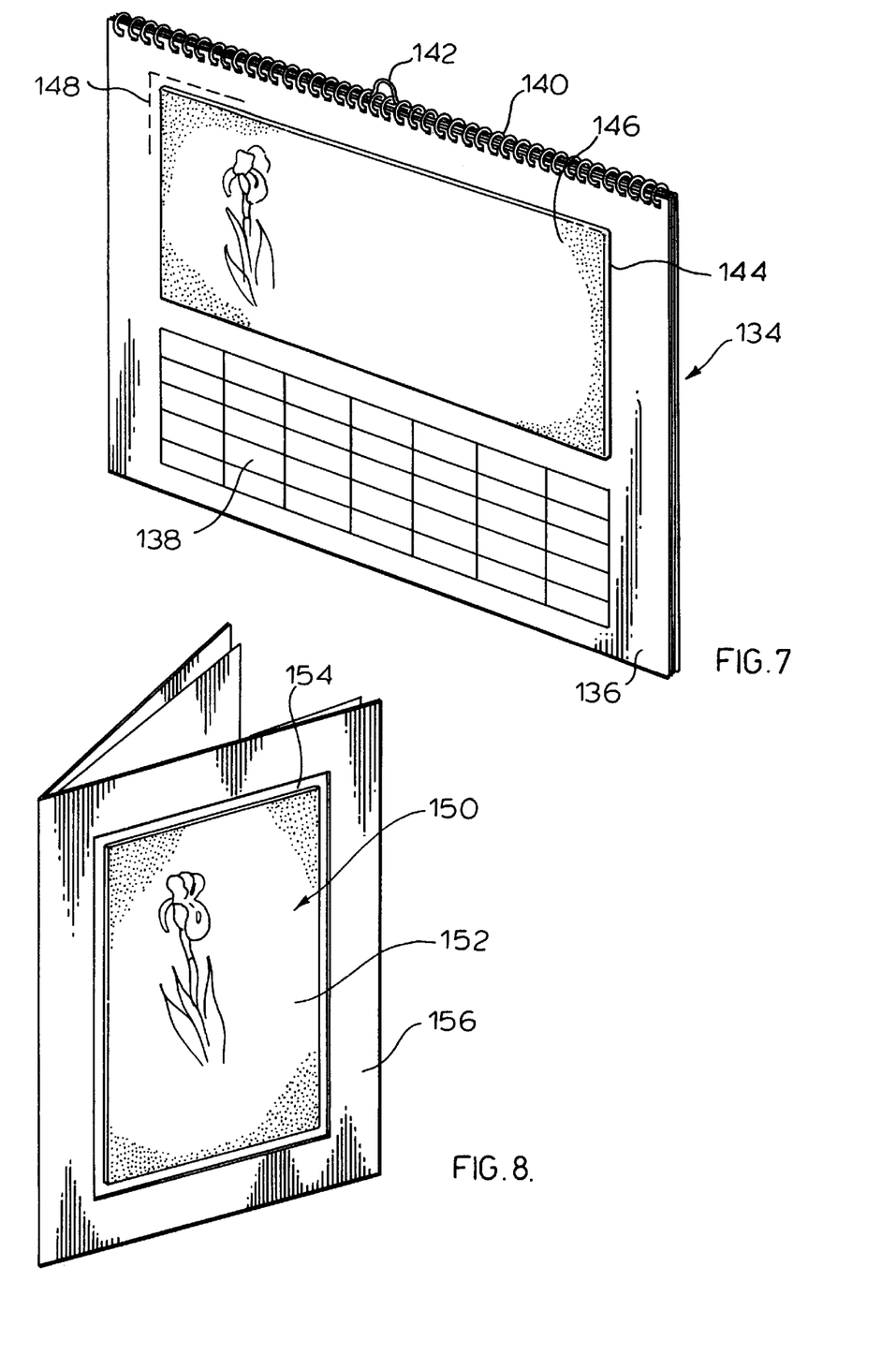
FIG. 7 is a perspective view of an alternative arrangement for the art reproduction as placed in a calendar.
FIG. 8 is a perspective view of the art reproduction mounted in a greeting card.

With the mounting system in accordance with the embodiment of FIG. 6, it is apparent that a quality product can now be provided in alternative mediums and at significantly reduced production costs, such as in calendars and greeting cards, as shown in FIGS. 7 and 8. The calendar 134 has individual sheets 136 with the usual day and month indications 138. The sheets 136 are bound by a wire spiral 140 with the usual hanging loop 142. On each sheet 136, an aperture 144 is cut therein through which the art reproduction 146 may be extended. The sheet 136 then functions as the holder or matte for the art reproduction. The flange as shown in dot at 148 for the artwork 146 is then secured to the rear face of the sheet 136 and optionally covered with a suitable backing so that each month has a new art reproduction. It is also understood that these reproductions may be removed from the calendar and by virtue of the flange, a suitable matte cut out for mounting of the artwork in the frame. The raised land 146 may optionally have the textured surface provided therein whether the substrate be of paper or plastic, although it is understood that the plastic being more durable would be the preferred substrate for providing artwork having the surface texture.

Similarly with greeting cards, books and the like, an art reproduction 150 having the raised land 152 may be positioned in a matte 154, such as with the embodiment of FIG. 6. The flange of the artwork 150 is secured to the rear face of the matte 154. The matte 154 is then secured to the rear face of the front page 156 of the greeting card or book and glued thereto to provide a finished product. This method of assembly is very quick and inexpensive and reliably positions the art reproduction 150 in the face of the greeting card or the like. Similar mounting procedures may be used in positioning the art reproduction in other types of consumer products, either by use of the matte 154 or by simply cutting an aperture in the face of the box to resemble the mounting system used in the calendar of FIG. 7.

It in also understood that this raised land system may be used in a variety of other products such as paint by number systems. By providing a raised land with a cardboard backing, the finished artwork may be readily framed to provide a very attractive final product. This provides quite a unique appearance to the usual paint by numbers systems. It is also understood that raised land may be formed as an irregular shape to highlight the boundary of an item image. For example, the image may be of an animal where the raised land follows the outline of the animal. The matte aperture is cut out to follow the irregular shape of the lip so that just the animal is presented in the aperture of the matte.

Although preferred embodiments of the invention have been described herein in detail it will be understood by those skilled in the art that variations may be made thereto without departing from the spirit of the invention or the scope of the appended claims.

We claim:

1. A framed art reproduction comprising:
   i) a thin sheet of deformable substrate having an artistic image reproduced on a front face thereof,
   ii) said thin sheet having an integral raised land portion containing said image, an integral flange surrounding said raised land and an integral continuous lip interconnecting said raised land to said flange, said lip being of a predetermined height defined by an extent to which said raised land is deformed in said substrate,
   iii) a matte for framing said raised land, said matte having an aperture provided therein as defined by an aperture edge of said matte, said aperture edge being dimensioned to engage said continuous lip and locate thereby said raised land relative to said matte; and
   iv) means for securing said located raised land in said matte with said flange contacting said matte.

2. A framed art reproduction of claim 1, wherein said matte is secured in a perimeter frame.

3. A framed art reproduction of claim 1, wherein said raised land has painting strokes on canvas of an original art formed in said substrate to be in register with said reproduced image.

4. A framed art reproduction of claim 3, wherein said substrate is an embossible paper or a thermoformable plastic.

5. A framed art reproduction of claim 4, wherein said substrate is plastic, said image being printed on said front face of said plastic sheet, said raised land portion being formed within said image whereby said image continues on said lip and onto said flange.

6. A framed art reproduction of claim 5 wherein said raised land as deformed in said substrate defines a recess in a rear face of said substrate, said recess being filled with a backing material to support the raised land.

7. A thermoformed art reproduction comprising an image printed on a face of a thermoformable plastic sheet, said sheet having thermoformed therein a raised land which includes a portion of said image and has a thermoformed surface texture which reproduces brushstrokes of an original painting of said image.

8. A thermoformed art reproduction of claim 7, wherein said raised land and said surface texture are thermoformed simultaneously in said plastic sheet by use of a female vacuum mold.

9. A thermoformed art reproduction comprising an image printed on a face of a thermoformable plastic sheet, said thermoformed art reproduction characterized by said sheet having thermoformed therein a raised land which includes a portion of said image and has a thermoformed surface texture which reproduces brushstrokes of an original painting of said image, said sheet also having an integral flange surrounding said raised land and an integral continuous lip interconnecting said raised land to said flange.

10. A thermoformed art reproduction of claim 9, wherein said raised land and said surface texture are thermoformed simultaneously in said plastic sheet by use of a female vacuum mold.

\* \* \* \* \*